United States Patent
Hirose

(10) Patent No.: US 7,224,688 B2
(45) Date of Patent: May 29, 2007

(54) COMMUNICATION TERMINAL DEVICE AND METHOD FOR CONTROLLING SAME

(75) Inventor: Hideyuki Hirose, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1046 days.

(21) Appl. No.: 10/373,764

(22) Filed: Feb. 27, 2003

(65) Prior Publication Data
US 2004/0081143 A1  Apr. 29, 2004

(30) Foreign Application Priority Data
Sep. 20, 2002  (JP) ............................. 2002-275252

(51) Int. Cl.
H04L 12/50 (2006.01)
(52) U.S. Cl. .................................... 370/360
(58) Field of Classification Search ................ 370/360, 370/363, 364, 367, 369, 383, 386, 387, 388, 370/389, 471, 902, 216, 217, 219, 220, 230, 370/231, 235, 244, 352, 353, 357
See application file for complete search history.

(56) References Cited

U.S. PATENT DOCUMENTS 5,805,684 A * 9/1998 Hirose et al. ............... 379/142
6,415,359 B1 * 7/2002 Kimura et al. .............. 711/137

FOREIGN PATENT DOCUMENTS

JP  A 2001-292249  10/2001

* cited by examiner

Primary Examiner—Chi Pham
Assistant Examiner—Alexander O. Boakye
(74) Attorney, Agent, or Firm—Oliff & Berridge, PLC

(57) ABSTRACT

A communication terminal device which has a network control unit for controlling connection with a network according to call set-up information from the network, wherein the network control unit is provided with a first communication control unit which is connected to the network, a control unit which has a built-in memory and judges whether it is receivable according to call set-up information from at least the network according to an output of the first communication control unit, and a second communication control unit which has an outside memory for storing a control program and controls communication with the network, and the control unit operates the first communication control unit and the second communication control unit in a normal state, cuts off the power supply to the second communication control unit in a standby state to operate the first communication control unit so to judge whether it is receivable according to the call set-up information from the network, and when it is judged to be receivable, resumes the power supply to the second communication control unit so to shift to the normal state to operate the first communication control unit and the second communication control unit.

12 Claims, 13 Drawing Sheets

COMMUNICATION TERMINAL DEVICE AND METHOD FOR CONTROLLING SAME

BACKGROUND OF THE INVENTION

1. Field of the Invention

The present invention relates to a communication terminal device and a method for controlling it, and more particularly to a communication terminal device which is connected to a network and realizes reduction of power consumption when it is in a standby state and a method for controlling it.

2. Description of the Related Art

In recent years, it has been strongly desired to realize power savings of business machines, telecommunications equipment and the like and to reduce power consumption. Under such circumstances, there have been proposed various power saving technologies, and among communication terminal devices such as facsimile machines and the like having a relatively high power consumption, many of them have been achieved to reduce the power requirements.

According to "Communication terminal device and method for controlling same" described in Japanese Patent Laid-Open Publication No. 2001-292249, there is proposed a communication terminal device which comprises a main control section and an ISDN network control section and, when it is in a standby state, the power supply to the main control section is cut off. Thus, it can operate with low power consumption.

Recently, as one of themes to reduce operation costs of the business machines and the like, the reduction of power consumption has been highly demanded.

The network control device being in standby mode analyzes the content of information received from the network and determines whether this information shall be received by the terminal of its own.

Here, it was found by considering minimum required components for realization of a judgment about reception during the standby state that a program ROM or a work RAM for controlling the network control section as a whole is not required to have a large capacity, and electrification to any component which does not relate to the reception decision processing is a cause of useless consumption of power.

The present invention has been made in view of the above circumstances and provides a communication control device and communication control method which reduces power consumption in a standby state by cutting off the power supply to elements of the network control section other than those which are used to judge reception of signals, when the communication terminal is on standby.

SUMMARY OF THE INVENTION

An aspect of the present invention provides a communication terminal device which has a network control unit for controlling connection with a network according to call set-up information from the network, wherein: the network control unit is provided with: a first communication control unit which is connected to the network; a control unit which has a built-in memory and judges whether it is receivable according to call set-up information from at least the network according to an output of the first communication control unit; and a second communication control unit which has an outside memory for storing a control program and controls communication with the network; and the control unit operates the first communication control unit and the second communication control unit in a normal state, cuts off a power supply to the second communication control unit in a standby state to operate the first communication control unit so to judge whether it is receivable according to the call set-up information from the network, and when it is judged to be receivable, resumes the power supply to the second communication control unit so to shift to the normal state to operate the first communication control unit and the second communication control unit.

Another aspect of the present invention provides a method for controlling a communication terminal device which has a network control unit for controlling connection with a network according to call set-up information from the network, wherein: the network control unit is provided with: a first communication control unit which is connected to the network; a control unit which has a built-in memory and judges whether it is receivable according to call set-up information from at least the network according to an output of the first communication control unit; and a second communication control unit which has an outside memory for storing a control program and controls communication with the network; the control unit operates the first communication control unit and the second communication control unit in a normal state, cuts off a power supply to the second communication control unit in the standby state to operate the first communication control unit so to judge whether it is receivable according to the call set-up information from the network, and when it is judged to be receivable, resumes the power supply to the second communication control unit so to shift to the normal state to operate the first communication control unit and the second communication control unit.

By the communication control device and method for controlling communication according to the present invention, the reduction of power consumption of the communication control device on standby can be achieved.

BRIEF DESCRIPTION OF THE DRAWINGS

Preferred embodiments of the present invention will be described in detail based on the following figures, wherein.

DESCRIPTION OF THE PREFERRED EMBODIMENTS

An embodiment of the communication terminal device according to the present invention and its control method will be described in detail with reference to the accompanying drawings.

Figure 1:
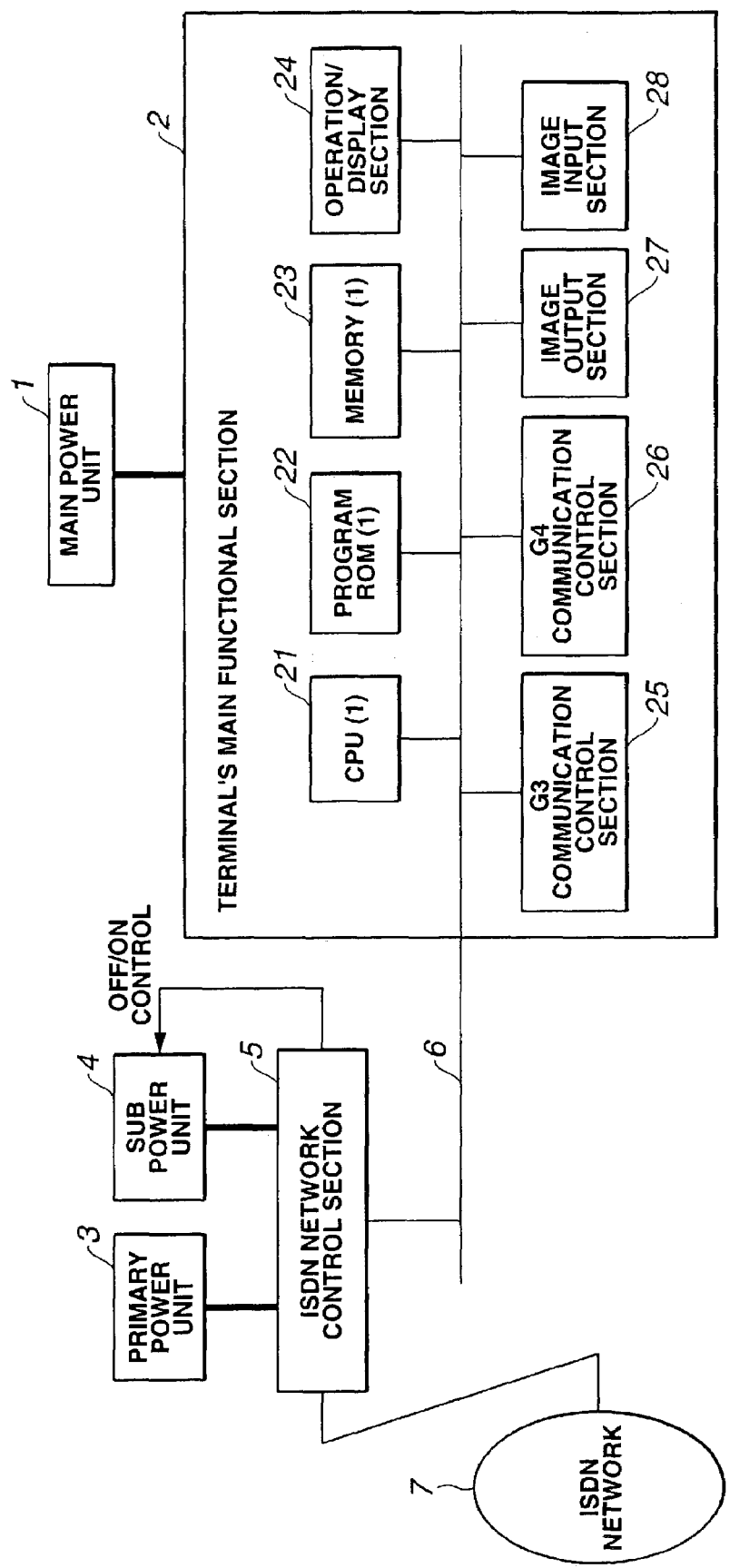
FIG. 1 is a block diagram showing an example of the structure of a communication terminal device which is connected with an ISDN network for communications.

FIG. 1 is a block diagram showing an example of the structure of a communication terminal device which is connected with an ISDN network for communications.

As shown in FIG. 1, the communication terminal device comprises a MAIN power unit 1, a terminal's main functional section 2, a system bus 6, an ISDN network control section 5, a primary power unit 3, and a SUB power unit 4.

To realize main functions of the communication terminal device (not shown), the terminal's main functional section 2 comprises a CPU (1) 21, a program ROM (1) 22, a memory (1) 23, an operation/display section 24, a G3 communication control section 25, a G4 communication control section 26, an image output section 27, and an image input section 28.

The CPU (1) 21 operates according to a control program stored in the program ROM (1) 22 to control the terminal's main functional section 2 as a whole.

The memory (1) 23 comprises a RAM (not shown), a hard disk (not shown) or the like to store information necessary to operate the terminal's main functional section 2 and is used as a work area when the CPU (1) 21 operates.

The operation/display section 24 is a user interface such as a control panel, and when operated by a user, shows an operation menu and setting information.

The G3 communication control section 25 and the G4 communication control section 26 conduct G3 communication and G4 communication with the other party connected via the ISDN network 7 and the ISDN network control section 5.

The image output section 27 prints facsimile-received documents, and the image input section 28 reads facsimile-transmitted documents.

The system bus 6 is a bus for exchange of data between the ISDN network control section 5 and the respective sections of the terminal's main functional section 2.

The MAIN power unit 1 supplies power to the terminal's main functional section 2, and the primary power unit 3 and the SUB power unit 4 supply power to the ISDN network control section.

The SUB power unit 4 is controlled to be turned ON/OFF by a signal from the ISDN network control section 5 to be described later.

Then, the inside structure of the ISDN network control section 5 will be described.

Figure 2:
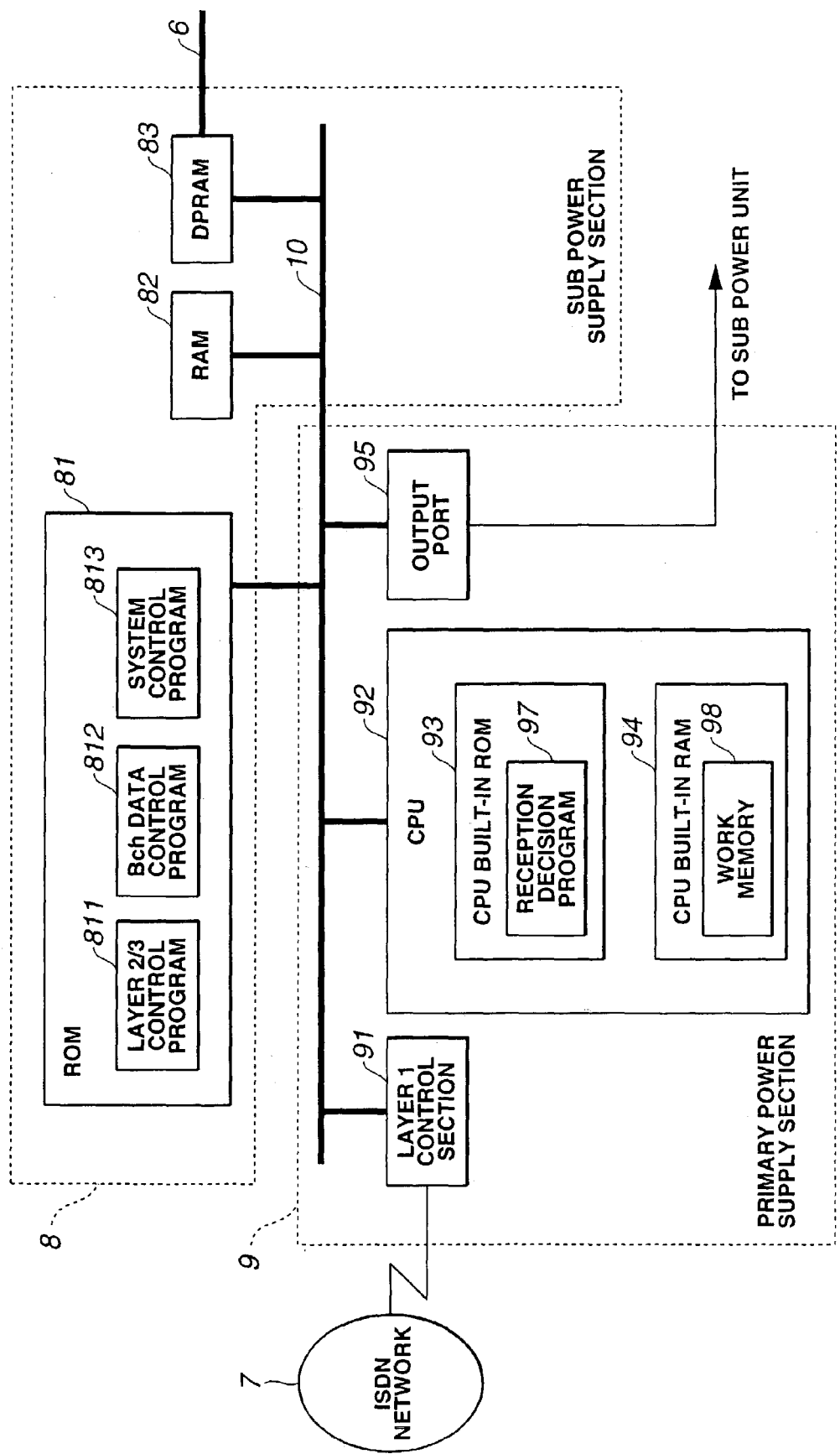
FIG. 2 is a block diagram showing a first structure of an ISDN network control section.

FIG. 2 is a block diagram showing a first structure example of the ISDN network control section 5.

As shown in FIG. 1, the ISDN network control section 5 is powered by two power units, the primary power unit 3 and the SUB power unit 4.

Therefore, each element of the ISDN network control section 5 is powered by belonging to a primary power supply section 9 which is supplied power by the primary power unit 3 or a SUB power supply section 8 which is supplied power by the SUB power unit 4.

The SUB power supply section 8 comprises a ROM 81, a RAM 82 and a DPRAM 83 (dual port RAM).

The ROM 81 further comprises a Layer 2/3 control program 811 for communication control according to an ISDN communication standard, a Bch data control program 812, and a system control program 813 for controlling the ISDN network control section 5

The DPRAM 83 is connected to the system bus 6 to exchange data with the terminal's main functional section 2.

Meanwhile, the primary power supply section 9 comprises a CPU 92, a Layer 1 control section 91, and an output port 95.

Each element of the SUB power supply section 8 and the primary power supply section 9 is connected by a local bus 10.

The CPU 92 comprises a CPU built-in ROM 93 and a CPU built-in RAM 94, controls the entire ISDN network control section 5 according to the programs stored in the ROM 81 and the CPU built-in ROM 93 and controls to switch between a normal operation (hereinafter referred to as a normal mode)/standby operation (hereinafter referred to as standby mode) by OFF/ON of the SUB power unit 4.

The Layer 1 control section 91 is connected to the ISDN network 7 to control at Layer 1 level (electrical and physical standards) of the ISDN communication standard.

The output port 95 outputs a control signal generated by the CPU 92 for switching ON/OFF of the SUB power unit 4.

Then, a memory space which is referenced by the CPU 92 at the time of controlling the ISDN network control section 5 will be described briefly with reference to the memory map (1) of FIG. 3.

The memory space which is referenced by the CPU is broadly divided into a ROM storage area m11 (head address: 000000h), a RAM storage area m12 (head address: 100000h), a CPU built-in ROM 93 storage area m13 (head address: 200000h), a CPU built-in RAM storage area m14 (head address: 200800h) and an outside I/O area m15.

The ROM storage area m11 comprises a system control program 813 area (head address: 000000h) which stores a program for controlling the ISDN network control section 5, the Layer 2/3 control program 811 which is a communication control program of the ISDN network 7 and the Bch data control program 812 area (head address: 050000h), and a Reserve area (head address: 0FF800h).

The RAM storage area m12 stores a work memory which becomes a work area or reference data when the CPU 92 normally performs various control processing.

The CPU built-in ROM storage area m13 judges communication ability while monitoring a SETUP (call set-up information) frame from the ISDN network 7 during standby and, when it is communicable, stores a reception decision program 97 which controls shifting to the normal mode.

And, the CPU built-in RAM storage area m14 stores as reference data of the reception decision program 97 which operates during standby information necessary for the ISDN network control or information (circuit switching, voice/audio/digital, G3, G4, etc.) about the communication ability of the communication terminal, and a work memory which becomes a work area during standby.

Then, a first operation of the ISDN network control section in the structure of FIG. 2 and the memory space of FIG. 3 will be described.

Figure 4:
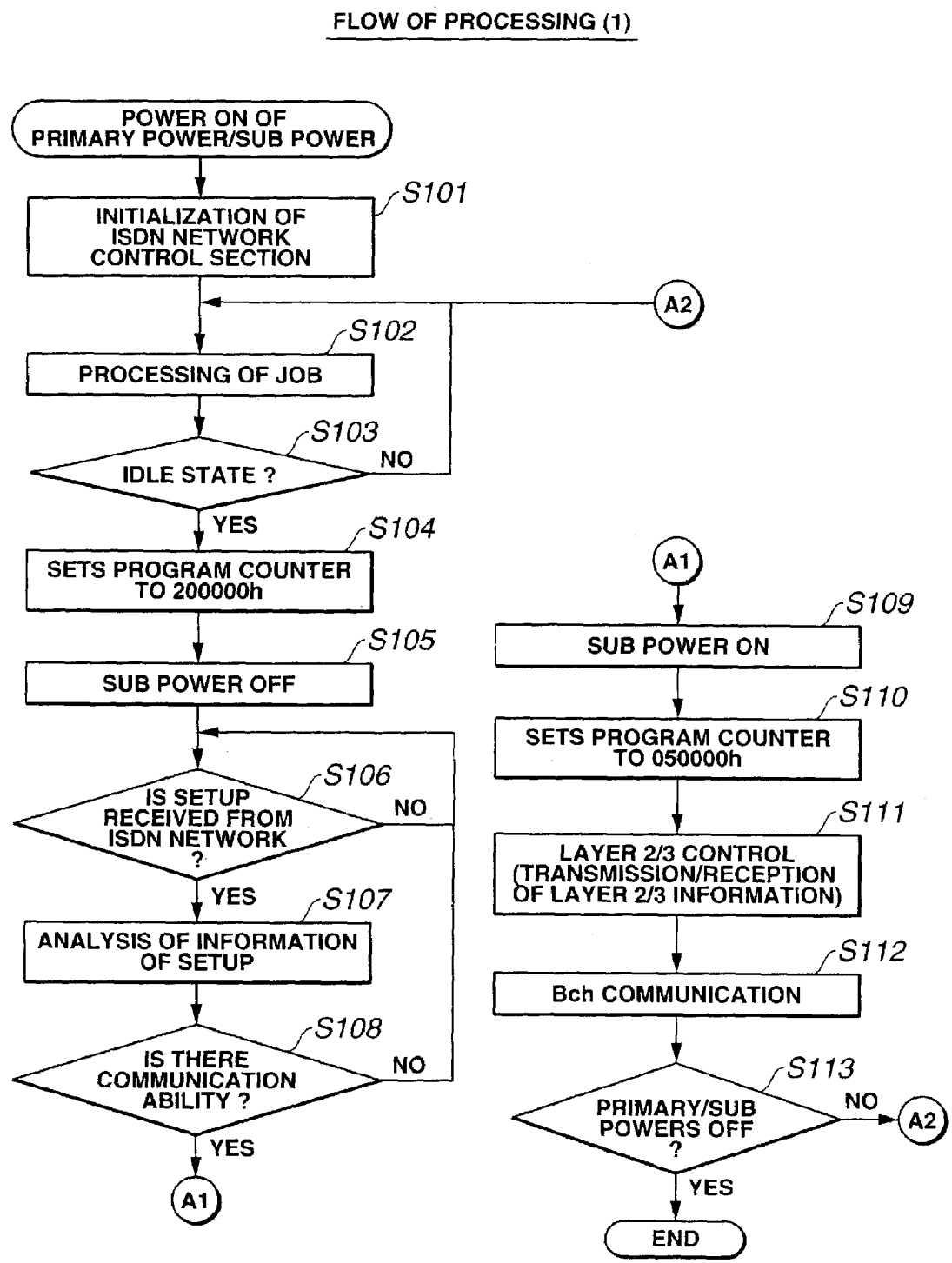
FIG. 4 is a flow of processing (1) showing a first operation example of the ISDN network control section.

FIG. 4 is a processing flow showing a first operation example of the ISDN network control section.

When the primary power unit 3 and the SUB power unit 4 are turned ON, the CPU 92 starts the system control program 813 to initialize the RAM 82 and the CPU built-in RAM 94 (step S101).

The ISDN network control section 5 activated as normal mode performs communication control on the basis of the Layer 1 control section 91, the Layer 2/3 control program 811, the Bch data control program 812, according to the ISDN communication standard (step S102).

The system control program 813 monitors a job to judge whether it is in an idle state or not (step S103).

Figure 3:
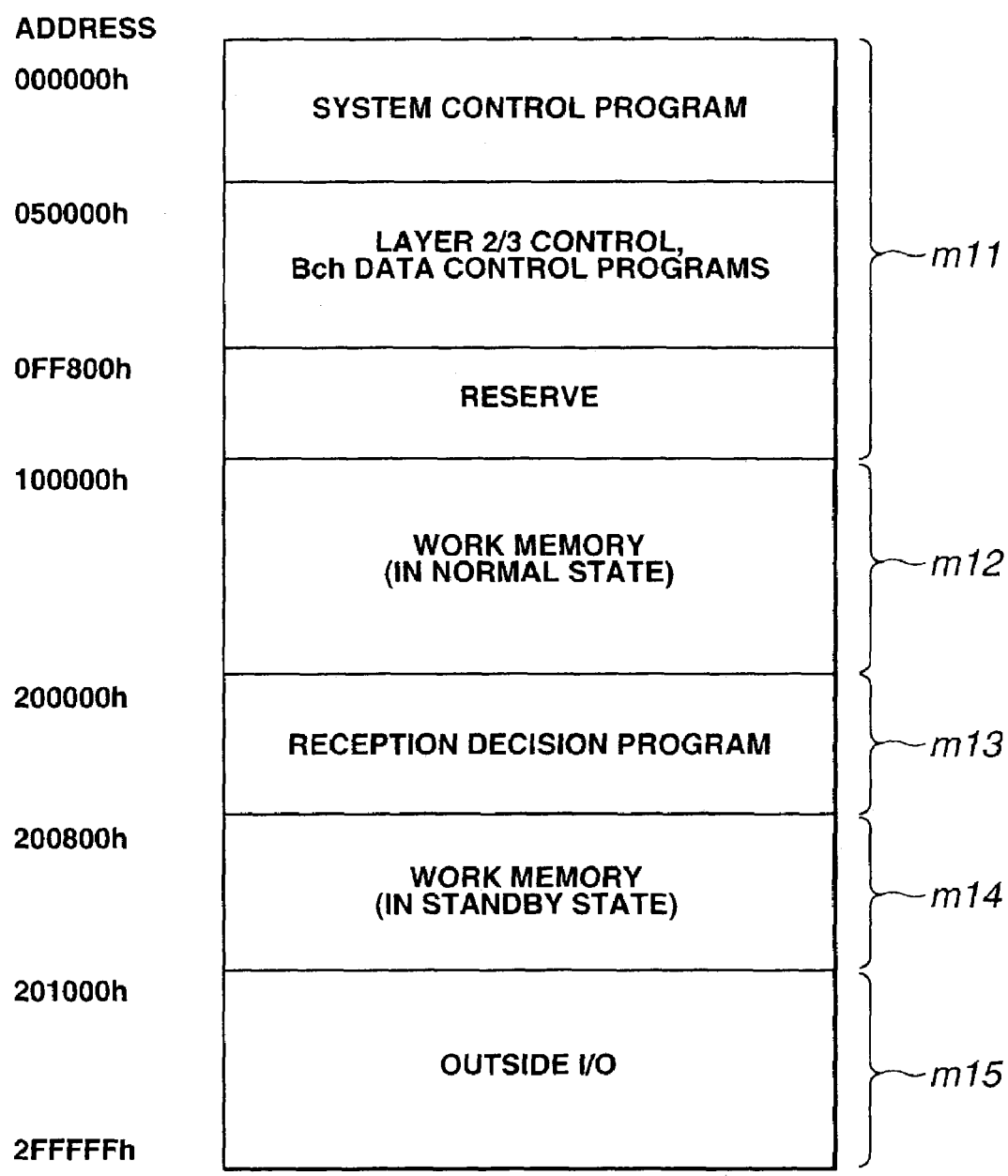
FIG. 3 is a memory map (1) showing a memory space which is referred to by a CPU in the first structure of the ISDN network control section.

Here, when the CPU 92 is not in an idle state (NO in step S103), the job is continuously processed (step S102) and, when it becomes an idle state (YES in step S103), the CPU 92 starts the reception decision program 97 stored in the CPU built-in ROM 93 (the value of the program counter is set to 200000h (head address of the reception decision program 97 in the memory map (1) of FIG. 3) (step S104).

And, the CPU 92 generates a control signal to turn OFF the SUB power unit 4 and outputs to the SUB power unit 4 through the output port 95 (step S105).

In this stage, the ISDN network control section 5 shifts to a standby mode to operate by only the Layer 1 control section 91, the CPU 92 and the output port 95 which are powered by the primary power unit 3.

During the standby mode, the reception decision program 97 monitors the reception of a SETUP frame from the ISDN network 7 (step S106).

Here, when the received frame is other than the SETUP frame, the received frame is discarded, and monitoring is continuously conducted (NO in step S106) and, when the SETUP frame is received (YES in step S106), information of the SETUP frame is analyzed (step S107).

Here, a list of communication functions processable by the terminal's main functional section 2 is compared with the communication function required by the received SETUP frame to judge reception ability (step S108).

When it is judged that there is not communication ability (NO in step S1108), the received SETUP frame is discarded, and it again becomes to wait the reception of a frame from the ISDN network 7.

When it is judged that there is communication ability (YES in step S108), the CPU 92 generates a control signal to turn ON the power of the SUB power unit 4 and outputs to the SUB power unit 4 through the output port 95 (step S109).

At this time, the ISDN network control section 5 returns from the standby mode to the normal mode.

And, the CPU 92 starts the system control program 813 in the ROM 81 to which power is supplied again (the value of the program counter is set to 050000h (the head address of the Layer 2/3 control program and the Bch data control program storage area in the memory map (1) of FIG. 3) (step S110).

The Layer 2/3 control program 811 performs synchronized control of the frame according to the ISDN standard (step S111).

And, data communication is performed according to the Bch data control program 812 (step S112).

After that, while the primary power unit 3 and the SUB power unit 4 are not turned OFF (NO in step S113), the job processing of step S102 and the monitoring of an idle state in step S103 are resumed.

When both the primary power unit 3 and the SUB power unit 4 are turned OFF (YES in step S113), the communication control processing is terminated.

Then, a message sequence between the ISDN network 7 and the ISDN network control section 5 in the first operation example of the ISDN network control section 5 will be described.

Figure 5:
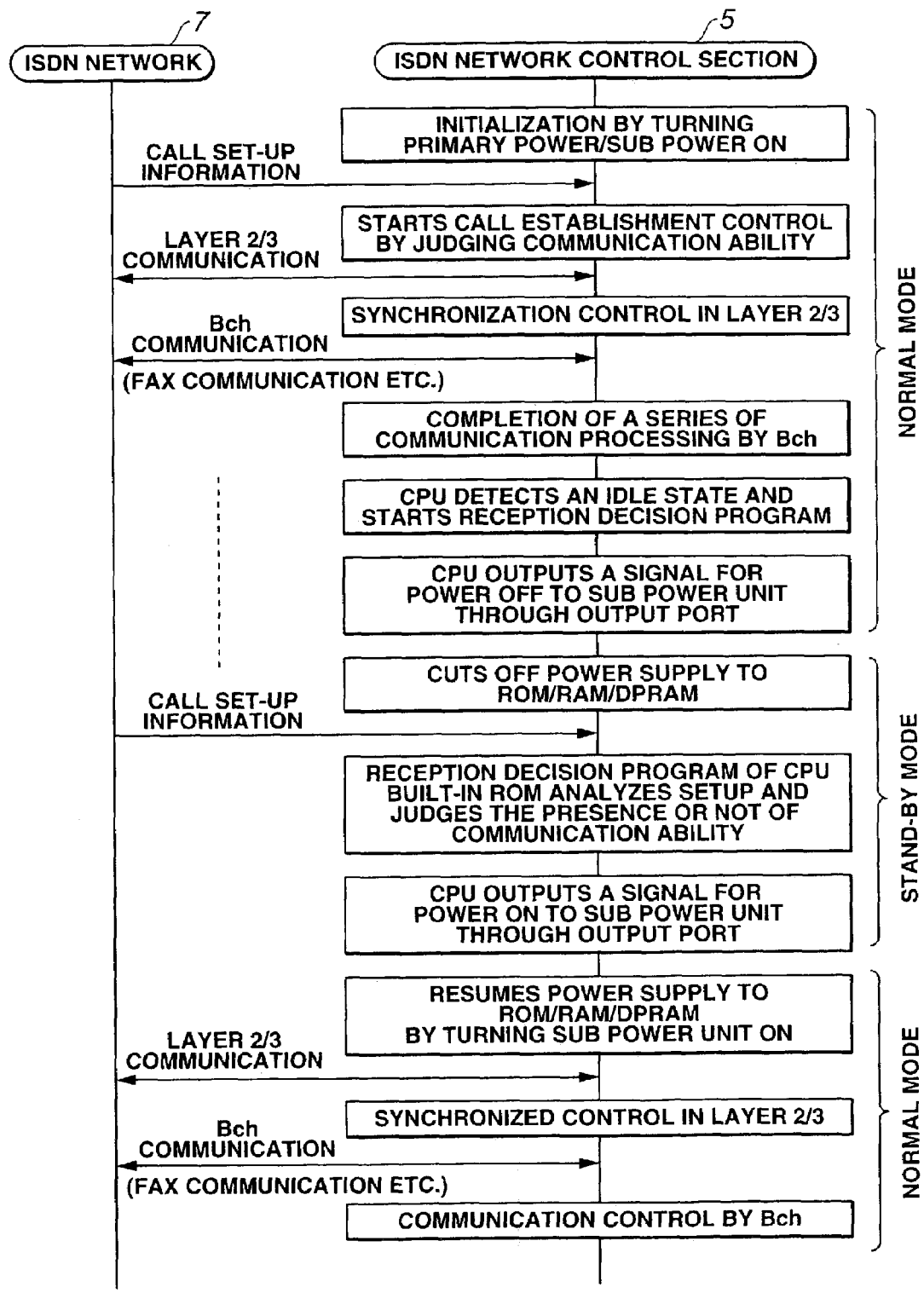
FIG. 5 is a sequence diagram (1) showing a signal flow between the ISDN network control section and the ISDN network side in the first operation example of the ISDN network control section.

FIG. 5 is a sequence diagram (1) between the ISDN network control section 5 and the ISDN network 7.

The ISDN network control section 5 initializes when the primary power unit 3 and the SUB power unit 4 are turned ON and starts an operation in a normal mode.

When the SETUP frame is received, the communication ability is judged, and if it is communicative, call establishment control is started.

And, communication control is performed in a Layer 2/3 level according to the ISDN communication standard, and data communication is performed by Bch communication (FAX data communication or the like) after establishment of synchronization.

After completing the Bch communication, while the next SETUP frame is received or sent, the communication control in the Layer 2/3 level according to the ISDN communication standard and the data communication processing by the Bch communication (FAX data communication or the like) after the establishment of synchronization are repeatedly processed.

Conversely, when a state without reception of the SETUP frame or a state without transmission data (idle state) is detected, the CPU 92 moves the control processing to the reception decision program 97 of the CPU built-in ROM 93, generates a control signal for power OFF and outputs to the SUB power unit 4 through the output port 95.

The ROM 81, the RAM 82 and the DPRAM 83 of the SUB power supply section 8 fall in a state that power supply is stopped when the power of the SUB power unit 4 is turned OFF and shift to a standby mode.

After that, the reception decision program 97 of the CPU built-in ROM 93 monitors the reception of the SETUP frame and judges the presence or not of the communication ability.

When it is judged that there is the communication ability by analyzing the SETUP frame received during the standby mode, a control signal for the power ON of the SUB power unit 4 is generated and output to the SUB power unit 4 through the output port 95.

And, the control processing is moved from the reception decision program 97 to the system control program 813 and returns to the operation in the normal mode.

The Layer 2/3 communication is conducted by the Layer 2/3 control program 811 in the ROM 81 to which power supply was resumed, and data communication processing by the Bch data control program 812 is performed.

Then, a second structure example of the ISDN network control section will be shown, and second, third and fourth operation examples of the ISDN network control section 5 will be described sequentially.

Figure 6:
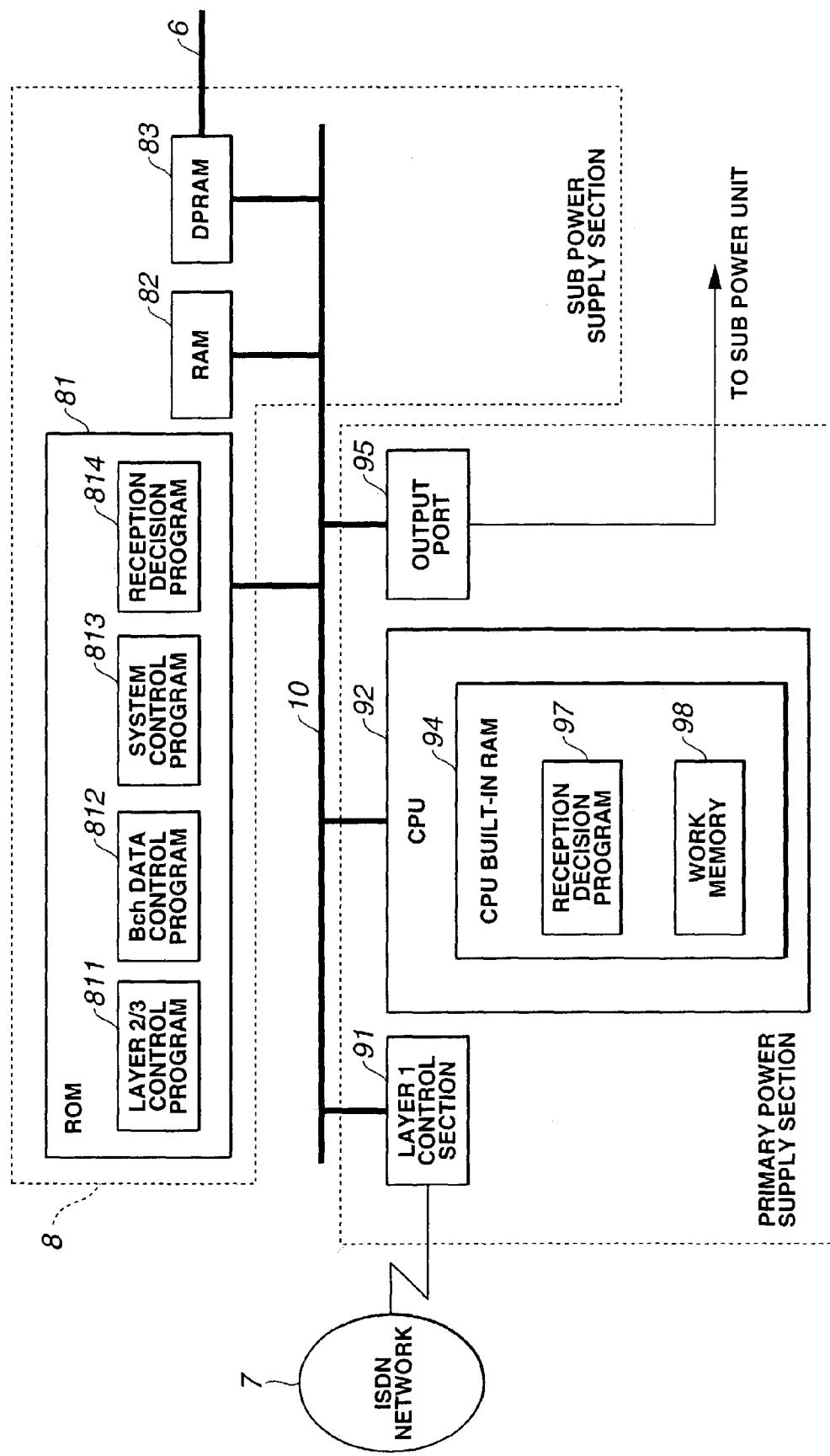
FIG. 6 is a block diagram showing a second structure of the ISDN network control section.

FIG. 6 is a block diagram showing the second structure example of the ISDN network control section 5.

Differences from the first structure example of the ISDN network control section 5 shown in FIG. 2 are in the addition of the reception decision program 814 to the ROM 81 and the limitation of the CPU 92 to the structure of the CPU built-in RAM 94 only.

By configuring as described above, the reception decision program 814 of the ROM 81 of the ISDN network control section 5 can operate as the reception decision program 97 downloaded to the CPU built-in RAM 94 during standby.

Figure 7:
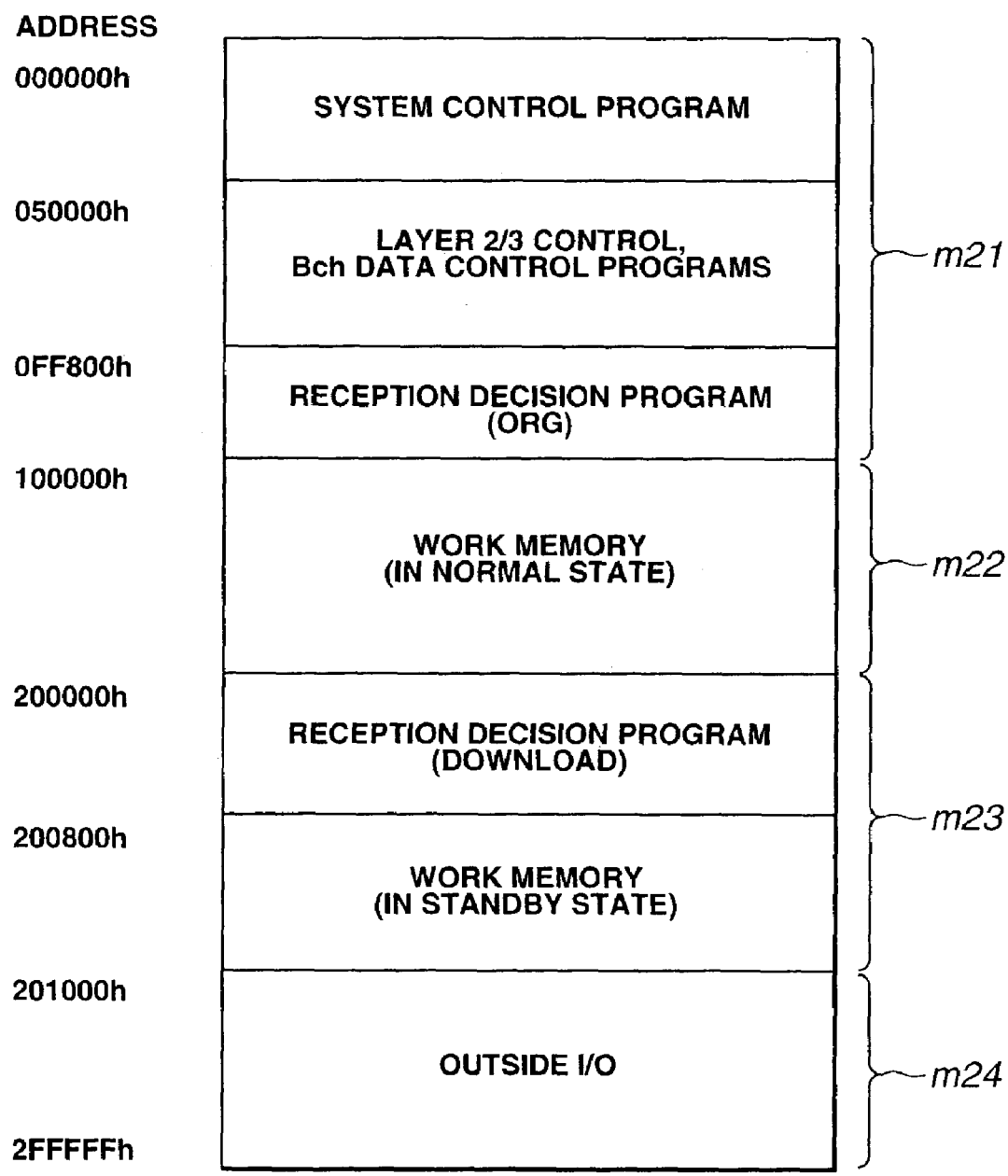
FIG. 7 is a memory map (2) showing a memory space which is referred to by a CPU in the second structure of the ISDN network control section.

FIG. 7 is a memory map (2) schematically showing the memory space when the ISDN network control section 5 operates in the second structure.

Differences from the memory map (1) shown in FIG. 3 are in the addition of a storage area (head address: OFF800h) of the reception decision program 814 to the ROM storage area m21.

And, the CPU built-in RAM storage area m23 comprises an area (head address: 200000h), to which the reception decision program 814 is downloaded in the standby mode, and a work memory.

Here, the reception decision program 814 of the ROM 81 is downloaded to the CPU built-in RAM 94 when the ISDN network control section 5 is initialized (second operation example) and when shifting to the standby mode (third operation example).

First, the second operation example will be described.

Figure 8:
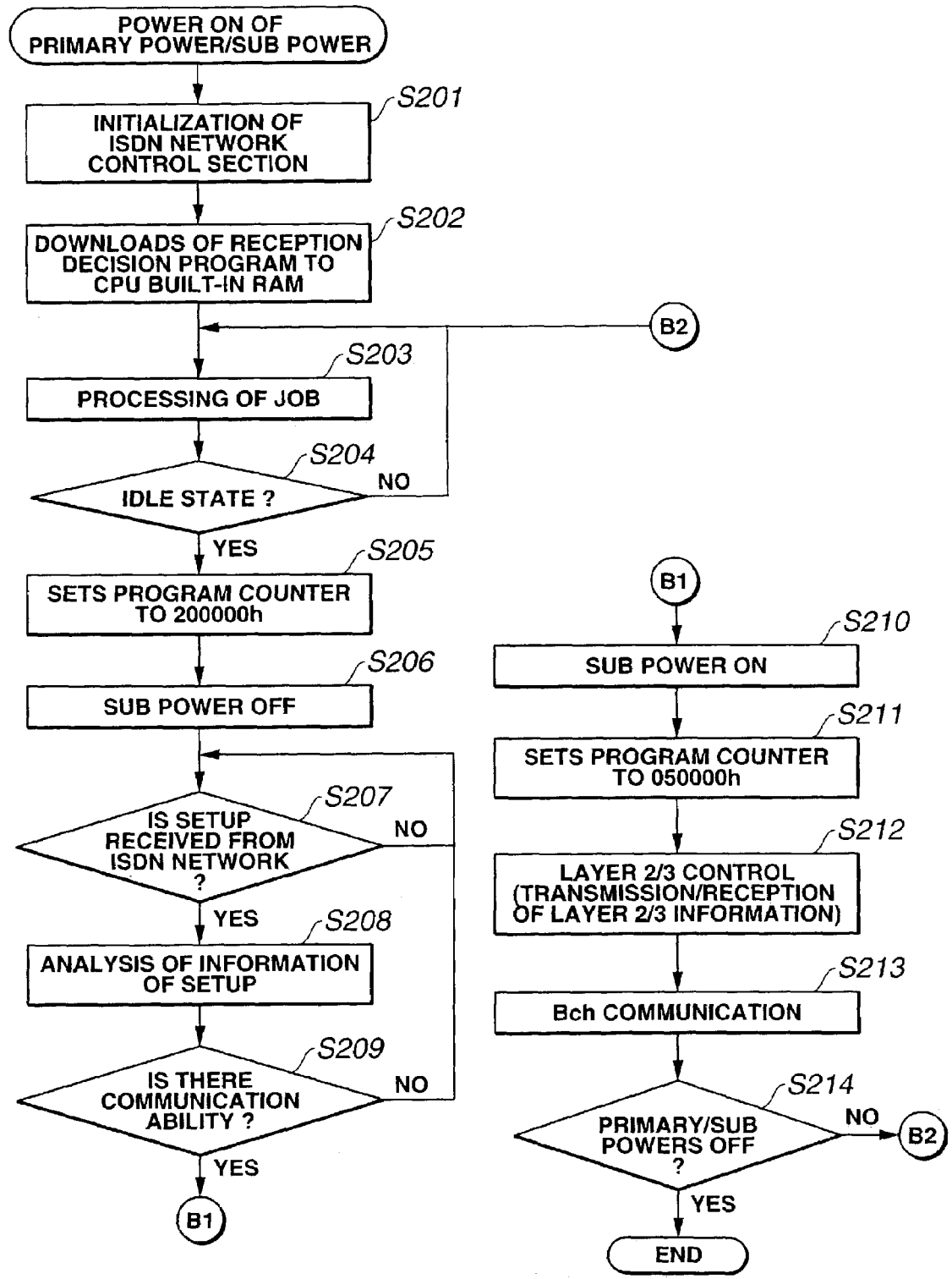
FIG. 8 is a flow of processing (2) showing a second operation example of the ISDN network control section.

FIG. 8 is a processing flow (2) showing the second operation example of the ISDN network control section 5.

When the primary power unit 3 and the SUB power unit 4 are turned ON, the CPU 92 starts the system control program 813 stored in the ROM 81 to initialize the RAM 82 and the CPU built-in RAM 94 (step S201).

And, the system control program 813 downloads the reception decision program 814 stored in the ROM 81 to the CPU 92 built-in RAM (step S202).

The ISDN network control section 5 activated in the normal mode sequentially processes the job of communication control based on communication ability information in the Layer 1 control section 91, the Layer 2/3 control program 811, the Bch data control program 812 and the RAM 82 according to the ISDN communication standard (step S203).

The system control program 813 monitors the job to judge whether it is in an idle state (step S204).

After that, the processing flow from the step S205 to the step S214 becomes the same as the processing steps from the step S104 to the step S113 of the processing flow (1) shown in FIG. 4.

Then, a sequence between the ISDN network 7 and the ISDN network control section 5 in the second operation example of the ISDN network control will be described.

Figure 9:
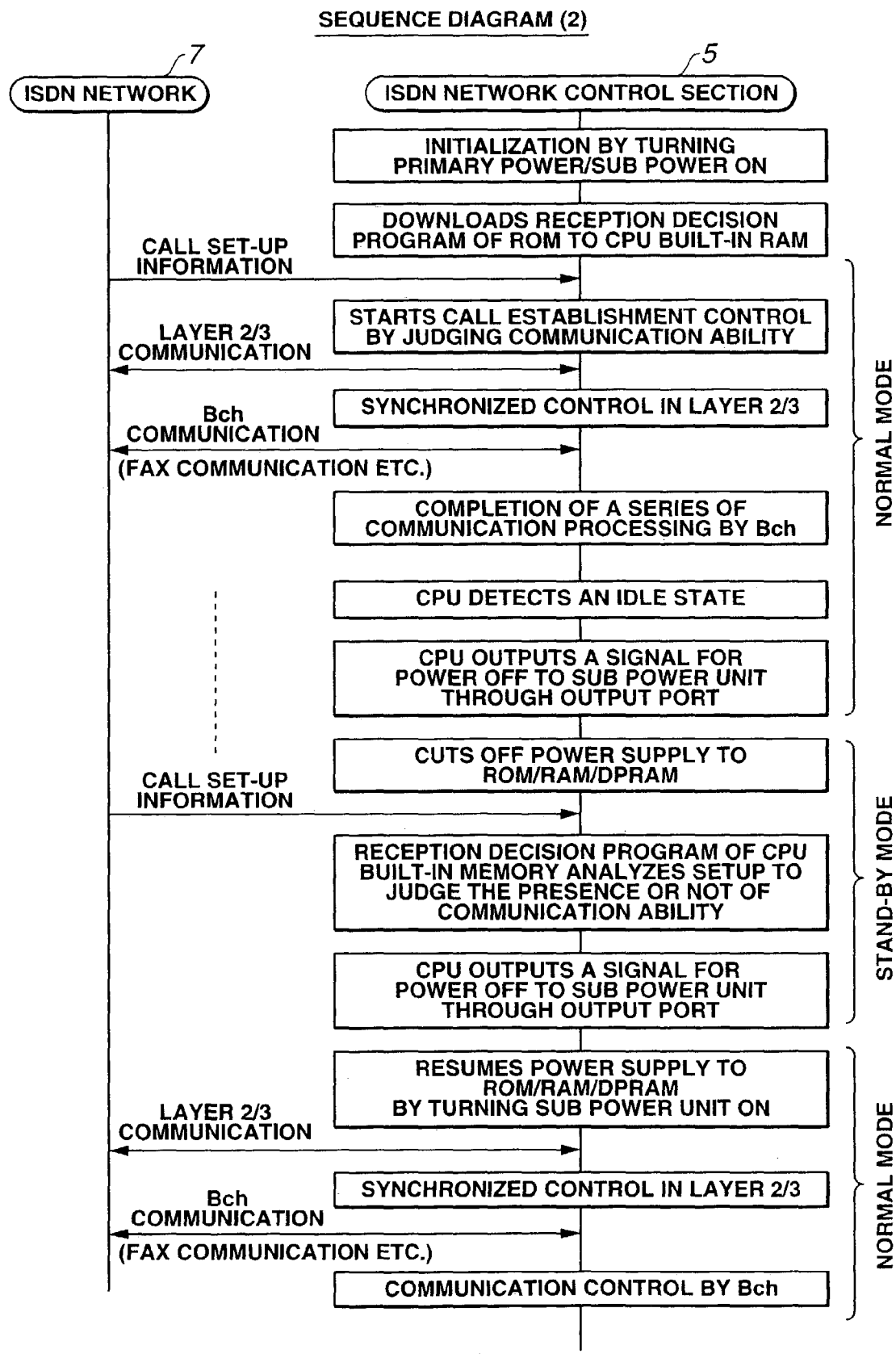
FIG. 9 is a sequence diagram (2) showing a signal flow between the ISDN network control section and the ISDN network side in the second operation example of the ISDN network control section.

FIG. 9 is a sequence diagram (2) between the ISDN network control section 5 and the ISDN network 7.

The ISDN network control section 5 initializes when the primary power unit 3 and the SUB power unit 4 are turned ON and starts an operation in the normal mode.

At this time, the system control program 813 has the reception decision program 814 of the ROM 81 downloaded to the CPU built-in RAM 94 upon the completion of initialization.

When the SETUP frame is received, communication ability is judged, and if communicative, call establishment control is started.

Synchronized control is performed by the Layer 2/3 communication according the ISDN communication standard, and after the synchronization is established, data communication is conducted by the Bch communication (FAX data communication or the like).

After the Bch communication is completed, while the next SETUP frame is being received or sent, communication control is made at the Layer 2/3 level according to the ISDN communication standard and after the synchronization is established, data communication processing by Bch communication (FAX data communication or the like) is conducted repeatedly.

Conversely, when a state without reception of the SETUP frame or a state without transmission data (idle state) is detected, the CPU 92 moves the control processing to the reception decision program 97 of the CPU built-in RAM 94, generates a control signal for power OFF and outputs to the SUB power unit 4 through the output port 95.

The ROM 81, RAM 82 and DPRAM 83 of the SUB power supply section 8 shift to the standby mode in that power supply is cut off as the SUB power unit 4 is OFF.

After that, the reception decision program 97 of the CPU built-in RAM 94 monitors the reception of the SETUP frame and judges the presence or not of communication ability.

When it is judged there is the communication ability by analyzing the SETUP frame received during the standby mode, a control signal for power ON is output to the SUB power unit 4 through the output port 95.

The control processing shifts from the reception decision program 97 to the system control program 813, and the operation in the normal mode resumes.

Layer 2/3 communication is made by the Layer 2/3 control program 811 in the ROM 81 to which power supply is resumed, and data communication processing is conducted by the Bch data control program 812.

According to the second structure example of the ISDN network control section 5 described above, the application of the volatile CPU built-in RAM 94 makes it easy to rewrite the update of the reception decision program 97 by downloading.

Then, the third operation example of the ISDN network control section 5 will be described.

Figure 10:
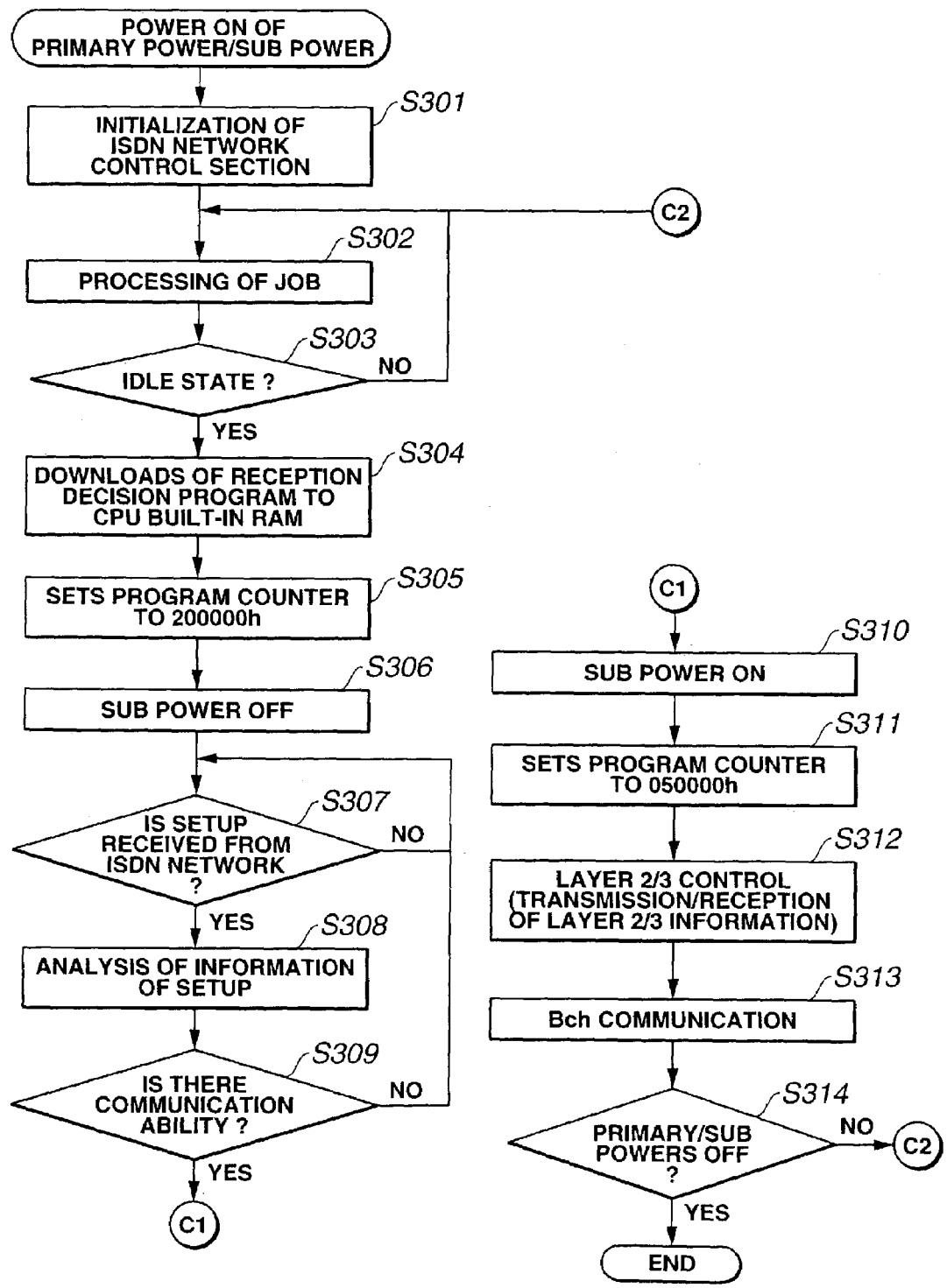
FIG. 10 is a flow of processing (3) showing a third operation example of the ISDN network control section.

FIG. 10 is a flow of processing (3) in the third operation example of the ISDN network control section 5.

Differences from the processing flow (2) shown in FIG. 8 are in the downloading of the reception decision program 814 of the ROM 81 into the CPU built-in RAM 94 immediately before shifting to the standby mode by detecting the idle state.

When the primary power unit 3 and the SUB power unit 4 become ON, the CPU 92 starts the system control program 813 to initialize the RAM 82 and the CPU built-in RAM 94 (step S301).

The ISDN network control section 5 activated in the normal mode processes a job of communication control according to communication ability information or the like in the Layer 1 control section 91, the Layer 2/3 control program 811, the Bch data control program 812, the RAM 82 (step S302).

The system control program 813 monitors the job to judge whether it is in an idle state (step S303).

Here, when it is not in the idle state (NO in step S303), the remaining job is processed continuously (step S302), and when it becomes an idle state (YES in step S303), the reception decision program 814 (head address: OFF800h of the memory map (2) of FIG. 7) stored in the ROM 81 is downloaded to the CPU built-in RAM 94 (head address: 200000h of the memory map (2) of FIG. 7) (step S304).

And, the reception decision program 97 stored in the CPU built-in RAM 94 is activated (the value of the program counter is set to 200000h (head address of the reception decision program 97 in the memory map (1) of FIG. 3) (step S305).

After that, the processing procedure from the step S306 to step S314 is same as the processing steps of from step S206 to step S214 of the flow of processing (2) shown in FIG. 8.

Figure 11:
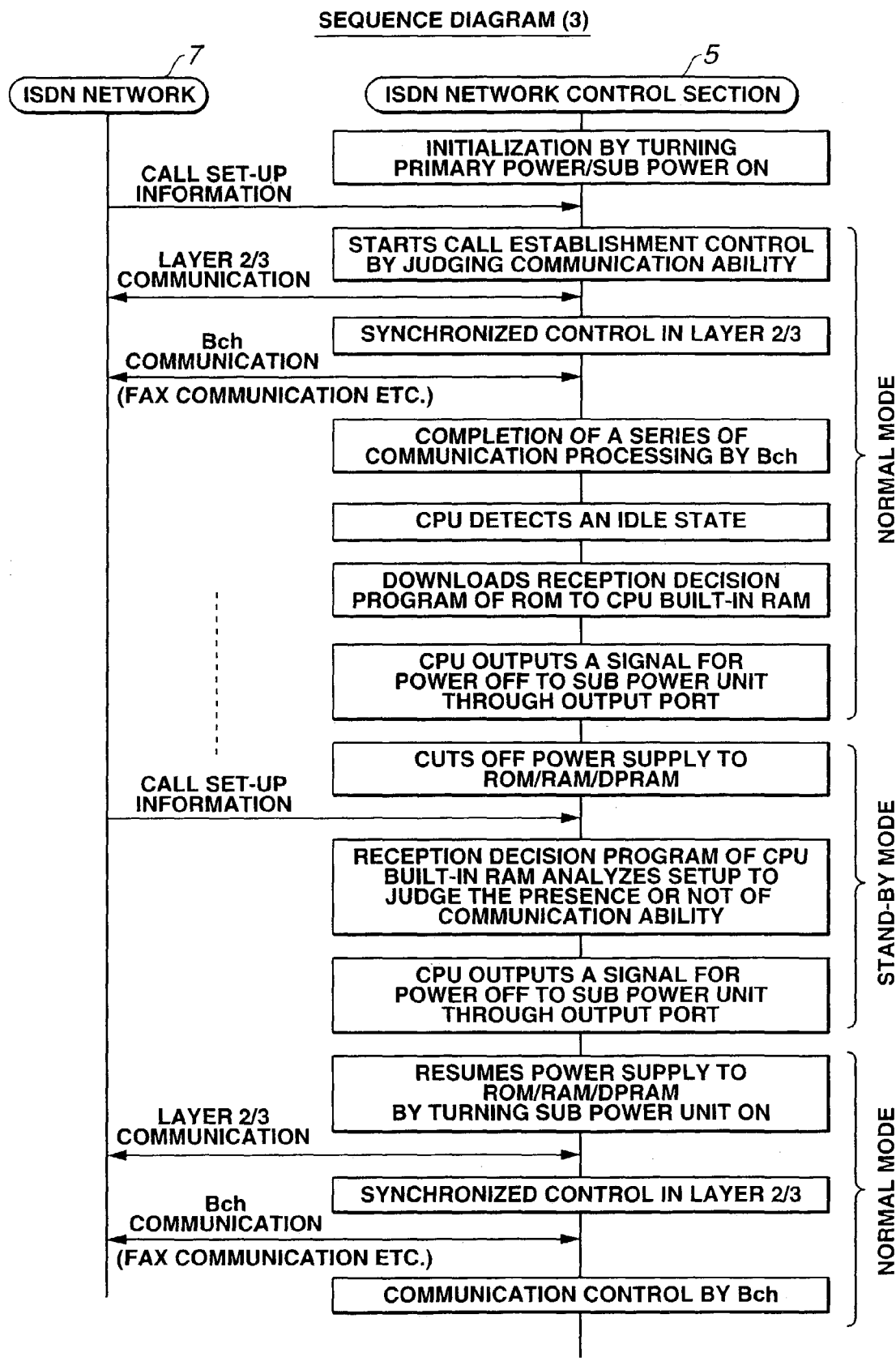
FIG. 11 is a sequence diagram (3) showing a signal flow between the ISDN network control section and the ISDN network side in the third operation example of the ISDN network control section.

FIG. 11 is a sequence diagram (3) between the ISDN network control section 5 and the ISDN network 7.

The ISDN network control section 5 initializes when the primary power unit 3 and the SUB power unit 4 are turned ON and starts an operation in the normal mode.

And, when the SETUP frame is received, communication ability is judged, and if communicative, call establishment control is started.

The Layer 2/3 communication control is performed according to the ISDN communication standard, and after the establishment of synchronization, data communication is conducted by the Bch communication (FAX data communication or the like).

After the Bch communication is completed, while the next SETUP frame is being received or sent, the communication control in the Layer 2/3 level according to the ISDN communication standard and data communication processing by the Bch communication (FAX data communication or the like) after the establishment of synchronization are repeatedly processed.

Conversely, when a state without reception of a SETUP frame or a state without transmission data (idle state) is detected, the CPU 92 downloads the reception decision program 814 of the ROM 81 to the CPU built-in RAM 94.

And, the CPU 92 shifts the control processing to the reception decision program 97, generates a control signal for the power OFF and outputs to the SUB power unit 4.

The ROM 81, RAM 82 and DPRAM 83 of the SUB power supply section 8 fall in a state with the power supply cut off because the SUB power unit 4 is turned OFF and shift to the standby mode.

After that, the reception decision program 97 of the CPU built-in RAM 94 monitors the reception of the SETUP frame and judges the presence or not of the communication ability.

When the reception decision program 97 analyzes the SETUP frame received during the standby mode and judges that there is communication ability, it generates a control signal for the power ON and outputs to the SUB power unit 4 through the output port 95.

The CPU 92 shifts the control processing from the reception decision program 97 to the system control program 813 and returns to the operation in the normal mode.

And, the Layer 2/3 communication by the Layer 2/3 control program 811 in the ROM 81 to which the power supply is resumed and the Bch data control program 812 conduct data communication according to the ISDN communication standard.

Thus, by applying the second structure example of the ISDN network control section 5 of the present invention, the flow of processing (3) and the processing sequence (3), a program is downloaded to the CPU 92 built-in memory immediately before shifting to the standby state, so that the area of the CPU 92 built-in memory can be used effectively for another usage (storage area during the normal operation control) during the normal operation.

Then, the fourth operation example of the ISDN network control section 5 will be described.

The fourth operation example of the ISDN network control section 5 has a feature that power consumption is reduced by a combination of the communication control in the Layer 1 level of the ISDN communication standard and an energy-saving function of the CPU 92 body provided by its manufacturer in the standby mode.

Figure 12:
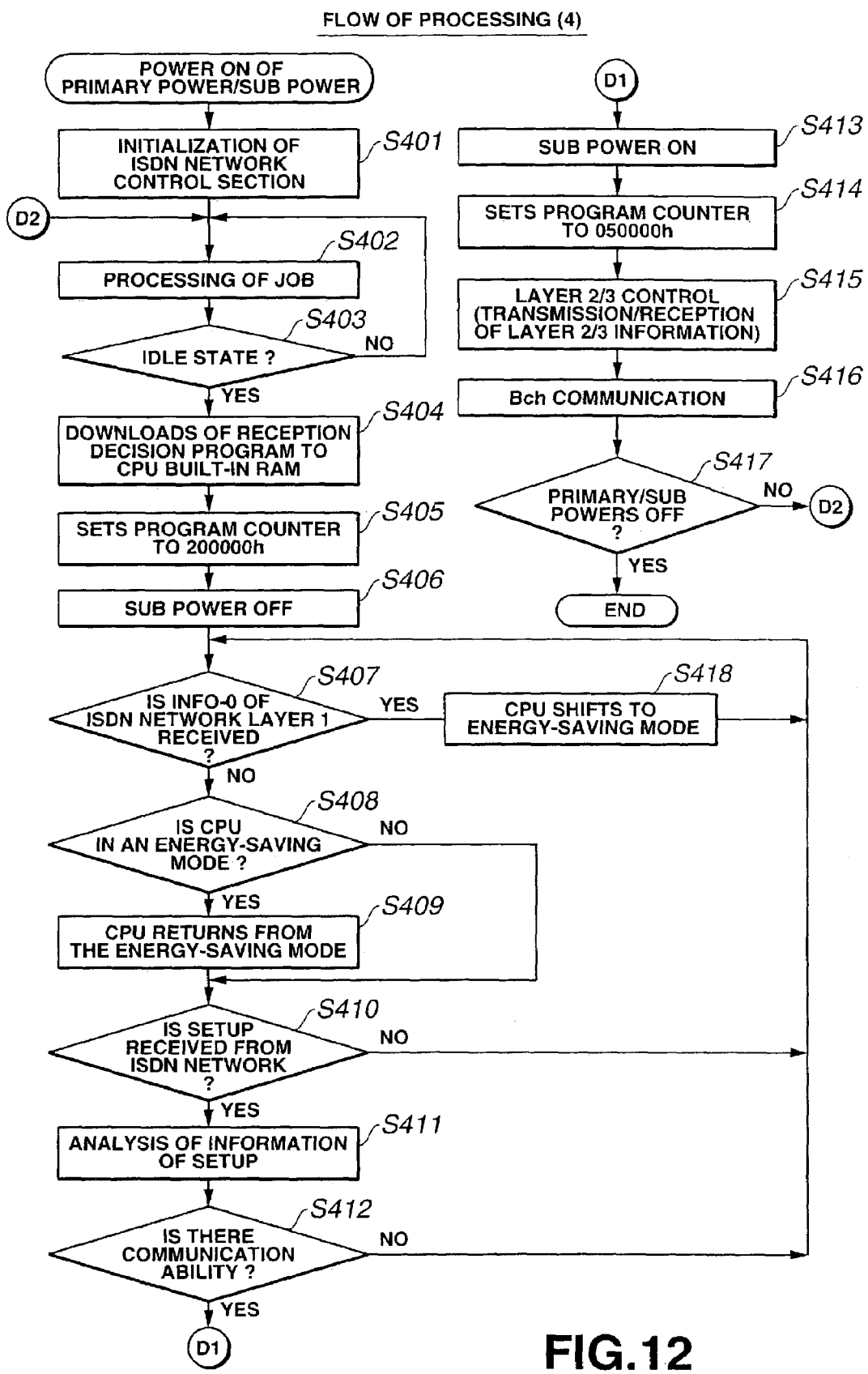
FIG. 12 is a flow of processing (4) showing a fourth operation example of the ISDN network control section.

FIG. 12 is a flow of processing (4) showing the fourth operation example of the ISDN network control section 5.

When the primary power unit 3 and the SUB power unit 4 become ON, the CPU 92 starts the system control program 813 to initialize the RAM 82 and the CPU built-in RAM 94 (step S401).

The ISDN network control section 5 started as the normal mode processes a job of communication control according to the Layer 1 control section 91, the Layer 2/3 control program 811, the Bch data control program 812 and communication ability information etc. in the RAM 82 (step S402).

The system control program 813 monitors the job to judge whether it is in an idle state (step S403).

Here, when it is in an idle state (NO in step S403), the remaining job is processed continuously (step S402), and when it becomes an idle state (YES in step S403), the reception decision program 814 of the ROM 81 is downloaded to the CPU built-in RAM 94 (step 404), and the reception decision program 97 stored in the CPU built-in RAM 94 is started (the value of the program counter is set to 200000h (head address of the reception decision program 97 in the memory map (2) of FIG. 7) (step S405).

The CPU 92 generates a control signal to turn OFF the SUB power unit 4 and outputs to the SUB power unit 4 (step S406).

At this stage, the ISDN network control section 5 shifts to a standby mode in which only the Layer 1 control section 91, the CPU 92 and the output port 95 to which power is supplied from the primary power unit 3 operate.

The Layer 1 control section 91 monitors a signal at the Layer 1 level according to the ISDN communication standard.

Here, when the reception signal receives INFO-0 (indicating no signal) (YES in step S407), the Layer 1 control section 91 outputs a control signal for making the CPU 92 be in an energy-saving mode (to lower a CLK frequency in the CPU 92 or to STOP the command) to the CPU 92.

Meanwhile, when the reception signal is other than INFO-0 (NO in step S407), and when the CPU 92 is in an energy-saving mode (YES in step S408), the Layer 1 control section 91 outputs an interruption signal to the CPU 92 to the normal mode (step S409).

When the CPU 92 is not in an energy-saving more (NO in step S408) or after the CPU 92 returns from the energy-saving mode, the reception of the SETUP frame from the ISDN network 7 is monitored (step S410).

Here, when the received frame is a SETUP frame (YES in step S410), information about the SETUP frame is analyzed (step S411).

Meanwhile, when a frame other than the SETUP frame is received (NO in step S410), the received frame is discarded to return to the signal monitoring processing at the Layer 1 level (Step S407).

When it is judged that there is no communication ability as a result of analyzing the received SETUP frame by the reception decision program 97 (NO in step S412), the received frame is discarded, and the procedure returns to the signal monitoring processing at the Layer 1 level (step S407).

Conversely, when the reception decision program 97 judges that there is communication ability (YES in step S412), a control signal to turn ON the SUB power unit 4 is generated and output to the SUB power unit 4 through the output port 95 (step S413).

At this point, the ISDN network control section 5 returns from the standby mode to the normal mode.

The CPU 92 starts the Layer 2/3 control program 811 in the ROM 81 to which power supply is resumed (the value of the program counter is set to 050000h (head address of the reception decision program 97 in the memory map (2) of FIG. 7) (step S414).

The Layer 2/3 control program 811 conducts communication control at the Layer 2/3 level according to the ISDN communication standard (step S415).

And, data communication is performed by the Bch data control program 812 (step S416).

After that, while both the primary power unit 3 and the SUB power unit 4 do not become OFF (NO in step S417), monitoring of the job processing in step S402 and the idle state in step S403 resumes.

When both the primary power unit 3 and the SUB power unit 4 become power OFF (YES in step S417), communication control processing of the ISDN network 7 is terminated.

Then, a flow of a signal between the ISDN network control section 5 and the ISDN network 7 in the fourth operation example of the ISDN network control section 5 will be described.

Figure 13:
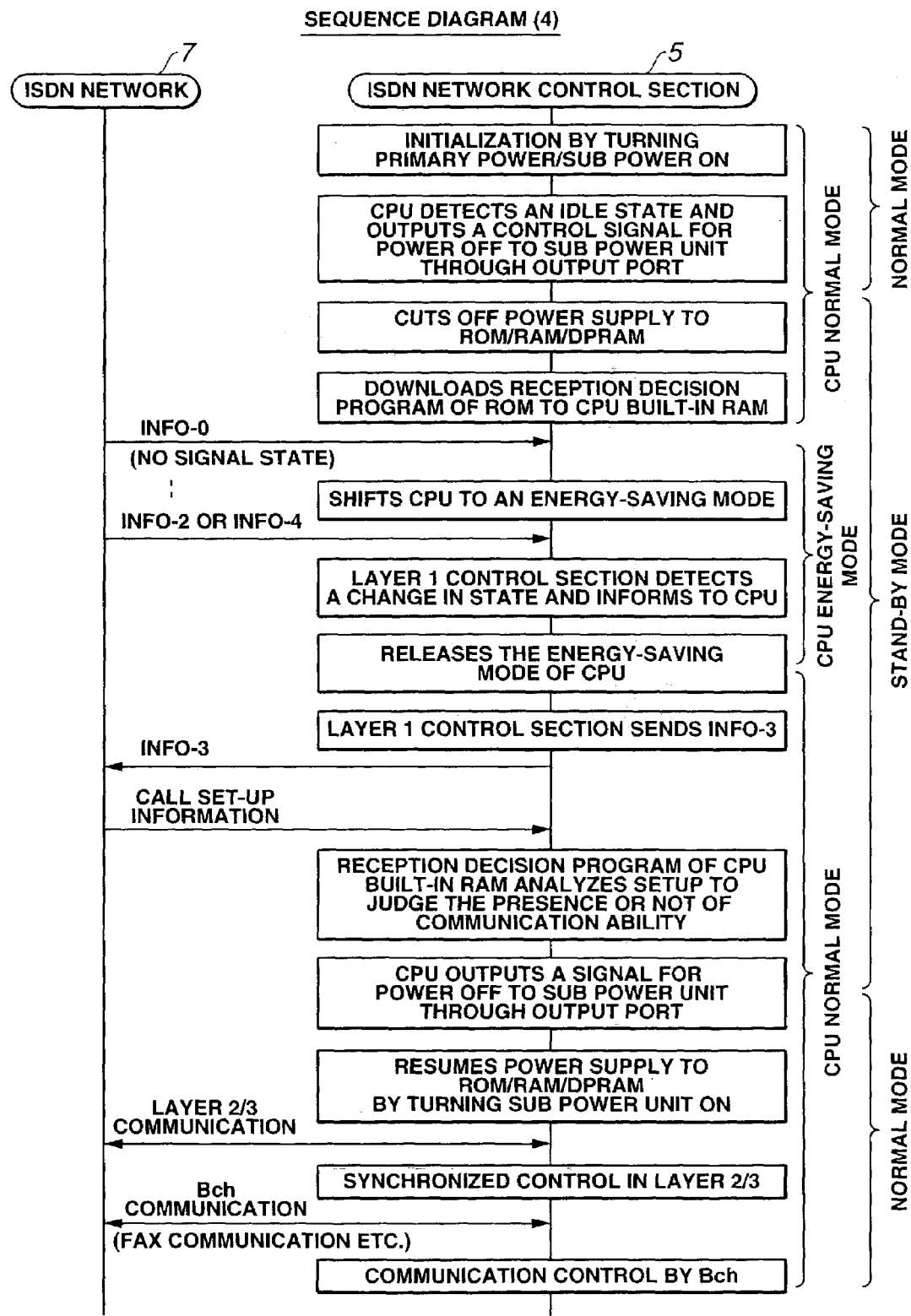
FIG. 13 is a sequence diagram (4) showing a signal flow between the ISDN network control section and the ISDN network side in the fourth operation example of the ISDN network control section.

FIG. 13 is a sequence diagram (4) between the ISDN network control section 5 and the ISDN network 7. It is a sequence diagram showing that the ISDN network control section 5 immediately becomes an idle state after its activation when power is turned on and then shifts to an energy saving mode of the CPU.

The ISDN network control section 5 initializes when the primary power unit 3 and the SUB power unit 4 are turned ON and starts the operation in the normal mode.

When the CPU 92 detects an idle state, it downloads the reception decision program 814 of the ROM 81 to the CPU built-in RAM 94, shifts the control processing to the reception decision program 97 and outputs a control signal for power OFF to the SUB power unit 4.

The ROM 81, the RAM 82 and the DPRAM 83 of the SUB power supply section 8 become a state with power supply cut off as the SUB power unit 4 is turned OFF, and the ISDN network control section 5 shifts to the standby mode.

Besides, during the standby mode, the Layer 1 control section 91 monitors a signal of the Layer 1 level according to the ISDN communication standard, and when it receives INFO-0, the Layer 1 control section 91 outputs a control signal for shifting the CPU 92 to the energy-saving mode to the CPU 92.

The Layer 1 control section 91 monitors the reception of a signal of INFO-2 (start signal) or INFO-4 (normal frame) from the ISDN network 7.

And, when the reception of a signal of INFO-2 or INFO-4 from the ISDN network 7 is detected, the Layer 1 control section 91 generates an interruption signal to release the energy-saving mode of the CPU 92 and outputs to the CPU 92.

The CPU 92 having received the interruption signal releases the energy-saving mode and returns to the normal mode.

And, the CPU 92 returns a signal of INFO-3 (response) to the calling side of the ISDN network 7.

The ISDN network 7 having received INFO-3 from the ISDN network control section 5 sends the SETUP frame to the ISDN network control section 5.

The reception decision program 97 of the CPU built-in RAM 94 having received the SETUP frame analyzes the received SETUP frame and refers to the communication ability stored in the CPU built-in RAM 94 to judge the presence or not of the communication ability.

When the reception decision program 97 judges that it is receivable, it produces a signal to control for turning ON the SUB power unit 4 and outputs to the SUB power unit 4 through the output port 95.

The reception decision program 97 shifts the control processing to the system control program 813 in the ROM 81 to which power supply from the SUB power unit 4 is resumed and returns to the normal mode.

And, the Layer 2/3 communication by the Layer 2/3 control program 811 in the ROM 81 to which the power supply is resumed and data communication processing by the Bch data control program 812 are performed.

By applying the structure of the ISDN network control section 5, the flow of processing (4) and the sequence diagram (4) in the above fourth operation example, when ISDN network control section 5 is in the standby with the power supply from the SUB power unit 3 cut off, the Layer 1 level detects the INFO-0 signal, it becomes possible to shift the CPU 92 body to the energy-saving mode, and even during the standby mode, power consumption at the CPU 92 level can be further reduced.

The second structure of the ISDN network 7 control section 5 shown in FIG. 6 may be configured in such a way that the reception decision program 97 downloaded to the CPU built-in RAM 94 may be a program stored in an outside storage medium or received by data communication by connecting to the network and downloaded to the CPU built-in RAM 94, other than the structure in which the reception decision program 97 is previously stored in the ROM 81.

By applying the first to fourth operation examples, the ISDN network control section 5 can operate only the CPU 92, the Layer 1 control section 91 and the output port 95 by being powered by only the primary power unit 3 in the standby mode and can operate the program in the standby mode by the CPU built-in ROM 93 or the CPU built-in RAM 94 having a small capacity by grouping into the elements which are powered by the primary power unit 3 and the elements which are powered by the SUB power unit 4.

Therefore, useless power consumption by the ROM 81, RAM 82 and DPRAM 83 which are powered by the SUB power unit 4 in the standby mode can be eliminated and power consumption can be reduced.

It should be noted that, in the above embodiment, the present invention is applied to the ISDN network; however, the present invention is not limited only to the application in relation to the ISDN network but can be applied widely to other digital communication networks.

What is claimed is:

1. A communication terminal device which has a network control unit for controlling connection with a network according to call set-up information from the network, wherein:
   the network control unit is provided with:
   a first communication control unit which is connected to the network;
   a control unit which has a built-in memory and judges whether it is receivable according to call set-up information from at least the network according to an output of the first communication control unit; and
   a second communication control unit which has an outside memory for storing a control program and controls communication with the network; and
   the control unit operates the first communication control unit and the second communication control unit in a normal state, cuts off a power supply to the second communication control unit in a standby state to operate the first communication control unit so to judge whether it is receivable according to the call set-up information from the network, and when it is judged to be receivable, resumes the power supply to the second communication control unit so to shift to the normal state to operate the first communication control unit and the second communication control unit.

2. The communication terminal device according to claim 1, wherein the first communication control unit controls communication of layer 1 with the network.

3. The communication terminal device according to claim 1, wherein the built-in memory has a nonvolatile memory which previously stores a control program of the control unit and a volatile memory which stores control information of the control unit.

4. The communication terminal device according to claim 1, wherein the built-in memory comprises a volatile memory and downloads, in an initial state, the control program of the control unit from the outside memory.

5. The communication terminal device according to claim 1, wherein the built-in memory comprises a volatile memory and, when shifting to the standby state, downloads the control program of the control unit from the outside memory.

6. The communication terminal device according to claim 1, wherein the control unit controls shifting from the normal state to the standby state and returning from the standby state to the normal state according to the output from the first communication control unit.

7. A method for controlling a communication terminal device which has a network control unit for controlling connection with a network according to call set-up information from the network, wherein:
the network control unit is provided with:
a first communication control unit which is connected to the network;
a control unit which has a built-in memory and judges whether it is receivable according to call set-up information from at least the network according to an output of the first communication control unit; and
a second communication control unit which has an outside memory for storing a control program and controls communication with the network;
the control unit operates the first communication control unit and the second communication control unit in a normal state, cuts off a power supply to the second communication control unit in the standby state to operate the first communication control unit so to judge whether it is receivable according to the call set-up information from the network, and when it is judged to be receivable, resumes the power supply to the second communication control unit so to shift to the normal state to operate the first communication control unit and the second communication control unit.

8. The method for controlling a communication terminal device according to claim 7, wherein the first communication control unit controls communication of layer 1 with the network.

9. The method for controlling a communication terminal device according to claim 7, wherein the built-in memory has a nonvolatile memory which previously stores a control program of the control unit and a volatile memory which stores control information of the control unit.

10. The method for controlling a communication terminal device according to claim 7, wherein the built-in memory comprises a volatile memory and downloads, in an initial state, the control program of the control unit from the outside memory.

11. The method for controlling a communication terminal device according to claim 7, wherein the built-in memory comprises a volatile memory and, when shifting to the standby state, downloads the control program of the control unit from the outside memory.

12. The method for controlling a communication terminal device according to claim 7, wherein the control unit controls shifting from the normal state to the standby state and returning from the standby state to the normal state according to the output from the first communication control unit.

* * * * *